United States Patent
Oldermann et al.

(12) 
(10) Patent No.: US 6,366,552 B1
(45) Date of Patent: Apr. 2, 2002

(54) DISK DRIVE WITH COMPENSATION OF DISK ECCENTRICITY

(75) Inventors: Klaus Oldermann; Heinz-Joerg Schroeder, both of Villingen-Schwenningen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/311,247

(22) Filed: May 13, 1999

(30) Foreign Application Priority Data

May 15, 1998  (EP) ............................................. 98401163

(51) Int. Cl.[7] ............................................. G11B 25/04
(52) U.S. Cl. ...................................... 369/263; 369/269
(58) Field of Search ................................ 369/263, 264, 369/269

(56) References Cited

U.S. PATENT DOCUMENTS

| | | | | |
|---|---|---|---|---|
| 4,098,513 A | * | 7/1978 | Klapproth et al. ........... | 369/263 |
| 4,101,945 A | | 7/1978 | Butsch ........................ | 360/102 |
| 4,325,133 A | * | 4/1982 | Reitmayer .................. | 369/263 |
| 4,441,178 A | * | 4/1984 | Kobayashi et al. .......... | 369/270 |
| 4,730,300 A | | 3/1988 | Kamoshita et al. ......... | 369/270 |
| 5,138,602 A | * | 8/1992 | Koike et al. .................. | 369/67 |
| 5,280,465 A | | 1/1994 | Dunbar et al. .............. | 369/266 |
| 5,610,900 A | | 3/1997 | Yamashita et al. .......... | 369/271 |
| 5,633,856 A | | 5/1997 | Mukawa ..................... | 369/270 |
| 5,757,762 A | * | 5/1998 | Lee ............................. | 369/271 |
| 5,761,186 A | | 6/1998 | Mushika et al. ............. | 369/271 |
| 6,005,311 A | * | 12/1999 | Matsushima ................. | 310/51 |
| 6,065,368 A | * | 5/2000 | Sohn ........................ | 74/573 R |

FOREIGN PATENT DOCUMENTS

| | | | |
|---|---|---|---|
| DE | 3146186 A1 | | 1/1983 |
| DE | 197 05 184 A1 | * | 8/1998 |
| EP | 0 514 606 A1 | * | 11/1992 |
| GB | 1469483 | | 4/1977 |
| GB | 2056747 A | | 3/1981 |
| GB | 2 115 203 A | * | 9/1983 |
| GB | 2307327 A | | 5/1997 |
| JP | 60-147964 | * | 8/1985 |
| JP | 7-85582 | | 3/1995 |
| JP | 10-172229 | * | 6/1998 |
| JP | 11-126418 | * | 5/1999 |

OTHER PUBLICATIONS

Patent abstracts of Japan, vol. 012, No. 473, Dec. 12, 1998, referring to Japanese Patent JP 63 191360.
Patent abstracts of Japan, vol. 011, No. 375, Dec. 8, 1987, referring to Japanese Patent JP 62 145562.
Patent abstracts of Japan, vol. 097, No. 011, Nov. 28, 1997, referring to Japanese Patent JP 09 198761.
Patent abstracts of Japan, vol. 098, No. 013, Nov. 30, 1998, referring to Japanese Patent JP 10 208377.
European Search Report citing the above–mentioned references AA, AB, AM, AN, AR, AS, AT, and AU.
Patent abstracts of Japan, vol. 095, No. 006, Jul. 31, 1995 refferring to Japanese Patent JP7–85582.
European Search Report citing the above–mentioned references AA, AB, AC, AD, AM, AN, AO, AR.

* cited by examiner

*Primary Examiner*—William Klimowicz
(74) *Attorney, Agent, or Firm*—Joseph S. Tripoli; Paul P. Kiel

(57) ABSTRACT

A device for rotating inside of a disk player and/or recorder a disk shaped data carrier which takes into account that the rotating disk may be eccentered from an imposed rotation axis. Side moving means allow the rotating disk and the fixing means to which the disk is removably fixed, to move inside said player and/or recorder in a rotation plane substantially perpendicular to an axis of rotation of said fixing means. The rotating disk and the fixing means go into a gyroscopic movement inside the player. A plurality of examples to realize the invention are described.

6 Claims, 7 Drawing Sheets

DISK DRIVE WITH COMPENSATION OF DISK ECCENTRICITY

BACKGROUND OF THE INVENTION

The present invention relates to a device used for rotating disk shaped data carriers inside of disk player and/or recorders.

A disk player and/or recorder is used to read and/or write on disk shaped data carriers. Different types of disk shaped data carriers are known, e.g. magnetical and optical disk shaped data carriers. Data may be stored along tracks which form for example concentrical circles or a spiral on the disk shaped data carrier. The disk shaped data carriers typically have an opening at a center, which ideally has substantially a common center with the disk shaped data carrier and the concentrical circles or the spiral. The disk shaped data carrier is rotated by driving means which are linked directly or indirectly to its opening, i.e. the driving means' rotation axis is made to correspond with the center of the disk. The data is read using reading means which follow the track. A servo system determines if the reading means deviate from the track being followed and if necessary move the reading means to reposition them on the track. The better the driving means' rotation axis corresponds to the center of the disk, the better the concentrical circles or spiral rotate around their own center and the less the servo system has to correct deviations to compensate for an eccentricity of the concentrical circle's or the spiral's rotation.

A data reading and/or writing rate of a disk player and/or recorder depends for a part on a disk's rotation speed. The reading and/or writing rate may for example be increased with a higher rotation speed of the disk. Typically a new problem arises in the disk player and/or recorder at higher rotation speeds. The player and/or recorder starts to vibrate, become more noisier and eventually to generate a greater number of reading and/or writing errors because the servo system may not anymore keep the reading means on track.

One reason for the new problem lies in the mass distribution of the disk shaped data carrier and parts fixed to it during its rotation. More precisely a mass center of the disk shaped data carrier and parts fixed to it may be located aside of the rotation axis imposed by the driving means and, as a result, the rotation of the disk generates forces which draw the disk away from the imposed rotation axis. The displacement of the mass center can be caused by labels on the disk, imperfect manufacturing of the disk, erroneous centering of the opening or other reasons. But it may also be related to the disk player and/or recorder itself.

A known solution to overcome the problems related to higher rotation speeds is to reduce the rotation speed until an acceptable level of noise, vibration and/or number of reading/writing errors is achieved. This of course reduces the data reading and/or writing rate.

SUMMARY OF THE INVENTION

It is an object of the present invention to find a device which allows to overcome the problems due to higher rotation speeds of the disk shaped data carrier.

The invention provides a device for rotating inside of a disk player and/or recorder a disk shaped data carrier having an opening around a center of the disk shaped carrier. The device comprises at least fixing means which allow to removably fix the disk by inserting a part of the fixing means in the opening and driving means which rotate the data carrier by acting on the fixing means. The driving means are at least partly mechanically connected to the disk player and/or recorder. The device further comprises side moving means which allow the fixing means to move inside the disk player and/or recorder in a rotation plane substantially perpendicular to an axis of rotation of the fixing means.

The fixing means move together with the disk inside the disk drive in a plane which has substantially a same orientation as centrifugal forces acting on a center of mass of a disk fixing means assembly which is located aside from a rotation axis of the fixing means imposed by the driving means. The vibrations on the disk player and/or recorder are reduced.

In a first preferred embodiment of the invention according to the invention the side moving means comprise sliding means which allow to move the driving means inside the player and/or recorder along directions which are parallel to the rotation plane and elastical elongation means fixed at one end to the player and/or recorder and at another end to the driving means, such that the driving means are positioned in a determined rest position at least when the driving means stop driving the data carrier.

An advantage of the preferred embodiment is that the fixing means may be mounted rigidly on e.g. a driving shaft of the driving means thus allowing for a very simple connection between driving means and fixing means.

In a second preferred embodiment according to the present invention the side moving means further comprise flexible transmission means through which the driving means act on the fixing means. An end of the flexible transmission means is connected to the driving means and another end is connected to the fixing means.

The second preferred embodiment allows to move the fixing means independently from the driving means. An advantage of this is that the moved mass is less than is if the driving means were to be moved as well.

In a third preferred embodiment according to the present invention the side moving means comprise first bearing means which are mounted on the fixing means, and the disk and/or recorder comprises at least a supporting surface parallel to the rotation plane, such that the first bearing means allow the fixing means to slide on the supporting surface while the fixing means rotate.

The third preferred embodiment shows a simple solution to realize a movement of the fixing means in the player and/or recorder.

In a fourth preferred embodiment according to the present invention the moving means comprise a sliding support and the disk and/or recorder comprises at least a supporting surface being parallel to the rotation plane; the sliding support slides on the supporting surface and the sliding support has a drive opening through which the driving means act on the fixing means.

The fourth preferred embodiment is particularly advantageous to reduce the intensity of friction between the moving means and the supporting surface since only the fixing means are driven and rotated by the driving means, i.e. the moving means do not have to rotate in the same way as the fixing means.

In a fifth preferred embodiment according to the present invention the side moving means comprise a sliding support having a drive opening through which said driving means act on said fixing means. The disk and/or recorder comprises at least a supporting surface which is parallel to the rotation plane, such that the sliding support slides on the supporting surface. In the device, at least an elongated part of the fixing means is fitted through the drive opening together with second bearing means which allow the elongated part to rotate inside the drive opening. The driving means comprise a rotor magnet mounted on the elongated part and a stator electro-magnet mounted on the player and/or recorder such that the rotor magnet and the stator electro-magnet cooperate as an electric motor. The device further comprises centering means which position the fixing means in a central position at least when the driving means stop driving the data carrier.

The fifth preferred embodiment allows to minimize a weight and size of the device according to the invention.

The invention further provides a device for rotating inside of a disk player and/or recorder a disk shaped data carrier having an opening around a center of the disk shaped carrier, the device comprising at least fixing means which allow to removably fix the disk by inserting a part of the fixing means in said opening, and driving means which rotate the data carrier by acting on the fixing means. The driving means are at least partly mechanically connected to the disk player and/or recorder. The fixing means comprise an elongated part; the driving means comprise a rotor magnet which is mounted on the elongated part and a stator electro-magnet mounted on said player and/or recorder such that the rotor magnet and the stator electro-magnet cooperate as an electric motor. The device further comprises centering means which position the fixing means in a central position at least when the driving means stop driving the data carrier.

The latter device for rotating inside of a disk player and/or recorder a disk shaped data carrier according to the invention is a mechanically simple and cheap way of realizing the invention.

The invention even further provides a device for rotating inside of a disk player and/or recorder a disk shaped data carrier having an opening around a center of said disk shaped carrier, which comprises at least fixing means allowing to removably fix the disk by inserting a part of the fixing means in the opening, and driving means for generating a driving force to rotate the data carrier. The driving means are at least partly mechanically connected to the disk player and/or recorder and comprise compressor means to generate a stream of air and canalization means to direct the stream of air onto a surface which belongs to the data carrier and/or the fixing means such that a driving force is transmitted to the data carrier which sets the data carrier into rotation and such that an air cushion lifts the data carrier and the fixing means reducing mechanical friction between the fixing means and the driving means. The device further comprises centering means which position the fixing means in a central position at least when the driving means stop driving the data carrier.

The latter device according to the invention is particularly advantageous because it reduces sources of frictions.

BRIEF DESCRIPTION OF THE DRAWINGS

In the following, ways of carrying out the invention claimed will be described using examples and referring to the drawings wherein:

DESCRIPTION OF THE PREFERRED EMBODIMENTS

All through the specification same references will be used to designate same parts. It is understood that the examples described hereafter are given to better understand the invention and are not limitative of the claimed invention. A person skilled in the art may well modify the described examples and remain in the scope of the present invention.

Figure 1:
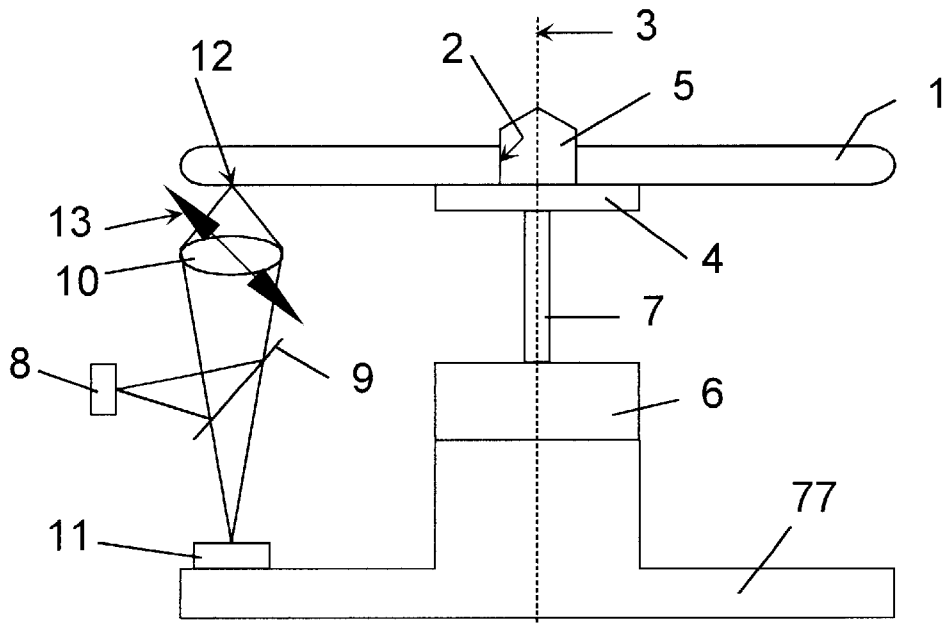
FIG. 1 contains a schematical drawing of a player and/or recorder according to prior art, FIG. 2 contains a schematical isometrical representation of a device according to the invention and comprising elastical elongation means, FIG. 3 contains a schematical representation of a device according to the invention comprising sliding fixing means, FIG. 4 contains a schematical representation of a device realized according to the invention and comprising a sliding support, FIG. 5 contains a schematical representation of a device realized according to the invention comprising a sliding support, FIG. 6 contains a schematical representation of an advantageous embodiment of a device according to the invention, FIG. 7 contains a schematical representation of a device according to the invention in which the data carrier levitates.

FIG. 1 contains a schematical representation of a disk player and/or recorder according to prior art. More precisely the example shown in FIG. 1 is an optical disk player and/or recorder seen in a sideview plane which is perpendicular to a disk shaped data carrier 1. The disk shaped data carrier 1, i.e. an optical disk has an opening 2 at its center. The data carrier 1 has data stored along tracks formed on a layer (not shown) of the data carrier 1. The data tracks form concentrical circles or spirals on the disk and remain in a rotation plane which is perpendicular to the sideview plane of the figure. The concentrical circles or the spirals have a center which ideally corresponds to a rotation axis 3 represented in FIG. 1 using a doted line. Preferably geometrical centers of the data carrier 1 and of the opening 2 correspond to the center of the concentrical circles or the spiral, i.e. the latter centers lie on the rotation axis 3. Fixing means comprise a plate 4 which supports a surface of the data carrier 1, and a part 5 which is inserted into the opening 2 such that the data carrier 1 is removably fixed to the fixing means 4 and 5. The part 5 of the fixing means may be a bobby well known by a person skilled in the art. Such a bobby may for example have on its outer periphery a number of balls pushed away from the rotation axis 3 by springs (not shown) such to maintain the data carrier 1 on the bobby. Driving means 6 are fixed to the disk player 77 represented by a hat shaped block for reasons of simplicity. The driving means 6 may for example comprise an electrical motor. An axis of the electrical motor is connected to rigid transmission means 7 which transmit a rotation of the electrical motor to the fixing means 4 and 5. This way the driving means 6 act on the fixing means 4 and 5, and rotate the data carrier 1 around the rotation axis 3.

The data stored along tracks on the data carrier 1 are read out using reading means which comprise a light source 8, a mirror 9 for redirecting light from the light source 8 to the data carrier 1, and focusing means 10 to focus the light beam on the data track being read. Light reflected by the data carrier 1 is detected by detection means 11 in order to restitute data stored on the data carrier 1. The light beam is focused on the track being read in a light spot 12. A servo system (not shown) continually verifies if the light spot 12 remains on the track being read. In case of a deviation of the light spot from the track the servo system controls radial positioning means and focusing means (not shown) to re-position the light spot 12 in radial but also in height direction, the latter corresponding to the direction of the rotation axis 3. The positioning in radial and height direction is schematically represented by a double arrow 13.

Frequently a mass center (not shown) of the data carrier 1 and/or a mass center of an assembly comprising the data carrier 1, the fixing means 4 and 5 and perhaps the driving means 6, does not correspond to the center defined by the rotation axis 3. When the disk is rotated a centrifugal force occurs which acts on the mass center, and tends to pull the data carrier 1 away from the rotation axis 3. At relatively high rotation speeds of the data carrier 1 the centrifugal force, which is asymmetrical relatively to the rotation axis 3 induces vibrations which impact on the disk player 77 and induce reading and/or writing errors in the reading means, the latter not being able anymore to keep the light spot 12 on the track being read.

The reading means shown in FIG. 1 are well known from a person skilled in the art and will for reasons of simplicity be omitted from the following FIGS. 2 to 11.

The example described in FIG. 1 relates to an optical disk drive. It is understood that any other kind of disk drive, e.g. a magnetical or an opto-magnetical disk drive could also be used to explain the invention. Of course a person skilled in the art would then use adapted reading and/or writing means.

Figure 2:
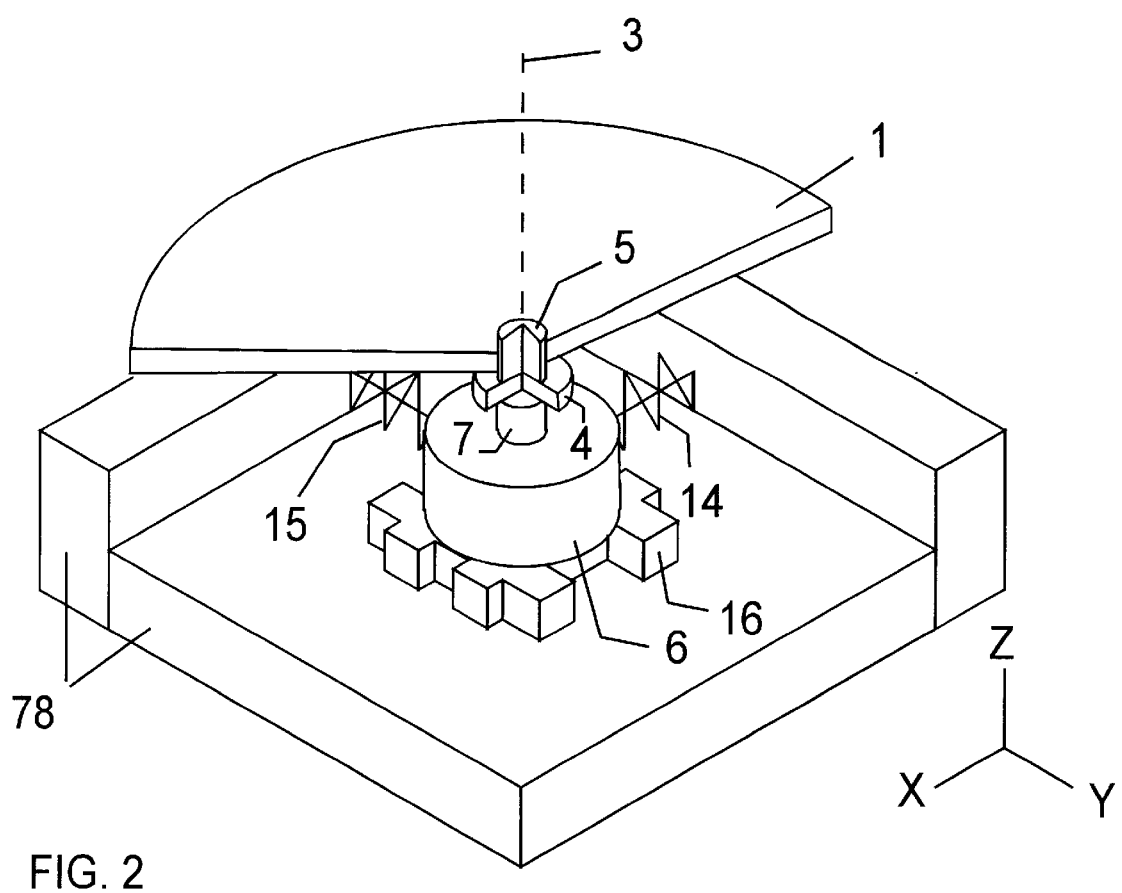

FIG. 2 contains a schematical isometric view of a device for rotating the disk shaped data carrier 1 (shown in part only). The data carrier 1 is fixed using fixing means 4 and 5 (shown in part only), the part 5 being inserted into the opening 2. The driving means 6 act on the fixing means 4 and 5 through transmission means 7. The driving means 6 are fixed to a disk player 78 through elastical elongation means, e.g. a first and a second spring 14 and 15. The driving means 6 lie on sliding means 16 which allows them to move in X and Y direction in the disk player 78. In a case where the driving means are at rest, i.e. the driving means 6 do not act on the fixing means 4, 5, the springs 14 and 15 keep the driving means 6 in a determined rest position.

As soon as the driving means 6 start to rotate the data carrier 1, the asymmetrical centrifugal forces which act on the eccentered mass center cause the springs 14 and 15 to elongate or shorten in X and Y direction respectively. The rotation axis 3 around which the data carrier 1 and the fixing means 4 and 5 are rotated remains parallel to the Z direction but starts moving in circles around the determined rest position. In fact, an assembly comprising the data carrier 1, the fixing means 4 and 5 and the transmission means 7 undergoes a gyroscopic movement. No vibration of the player 78 is caused by the movement of the assembly. The fact that the rotation axis 3 now describes circles around the determined rest position creates a periodic deviation of the data track being read relatively to the reading means. This periodic deviation needs to be corrected by the servo means.

Figure 3:
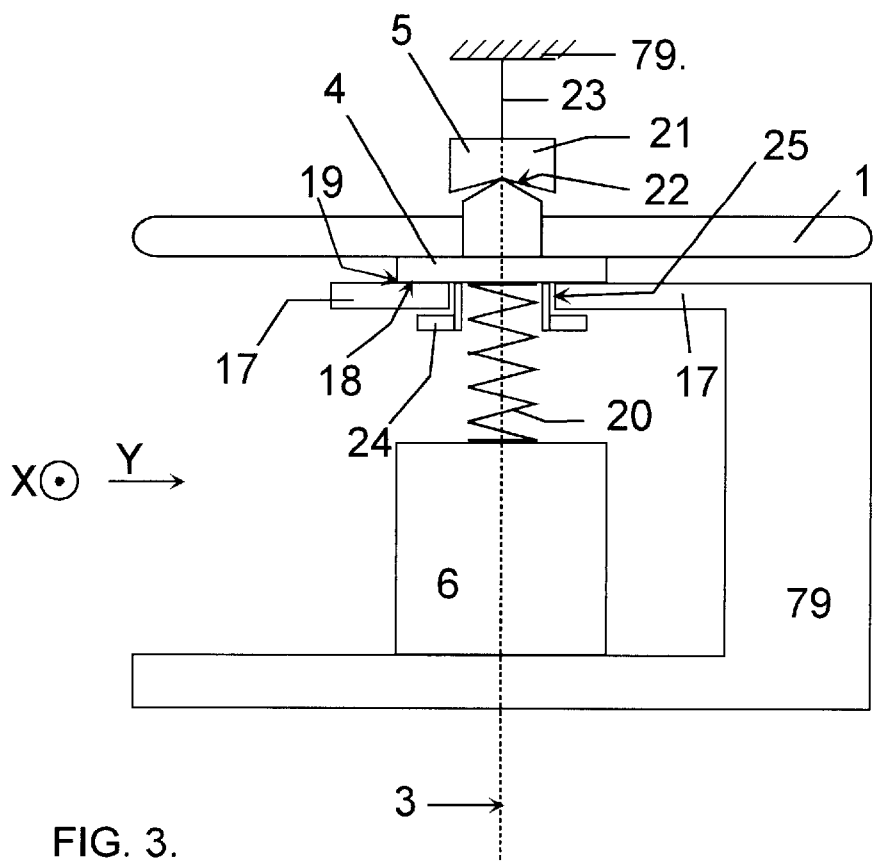

A disk player 79 in FIG. 3 has the driving means 6 fixed to it in a manner similar as in FIG. 1. The disk player 79 comprises a platform 17 which presents a supporting surface 18 to the fixing means' plate 4. First bearing means which may not be seen but who's location is indicated by an arrow 19 are located between the fixing means' plate 4 and the supporting surface 18 and allow the fixing means 4 and 5, and the data carrier 1 to slide on the disk player 79. The driving means 6 act on the fixing means 4 and 5 through flexible transmission means 20 which allows to transmit a rotation movement from the driving means 6 to the data carrier 1 while the sliding means 4 and 5, and the data carrier 1 are also allowed to move in Y and X direction. Centering means 21 apply a force on the part 5 of the fixing means in order that the fixing means 4 and 5 remain in contact with the supporting surface 18.

The first bearing means in 19 must be realized such that the fixing means' plate 4 may rotate and slide sideways at the same time on the supporting surface 18. The first bearing means 19 may for example be realized using a layer of grease or conventional ball bearings.

The centering means 21 comprises a conical recess 22 and is mounted on the disk player 79 using a flexible bar 23. The centering means 21 are realized such that the fixing means return to a central position which correspond to the rest position of the rotation axis 3 when the driving mean 6 are at rest. The flexible bar 23 enables the centering means 21 to accompany the fixing means 4 and 5 during the gyroscopic movement.

Alternately it may be found that the fixing means 4 and 5 receive an edge 24 which grabs through a drive opening 25 of the disk player platform 17. In this case, the centering means 21 may be omitted because the edge 24 prevents the fixing means of departing from the supporting surface 18 under the effect of the flexible transmission means 20. Preferably, the edge 24 is equipped with bearing means similar to the first bearing means in 19 such that the fixing means 4, 5 and the edge 24 may freely slide and rotate on supporting surfaces of the platform 17.

Figure 4:
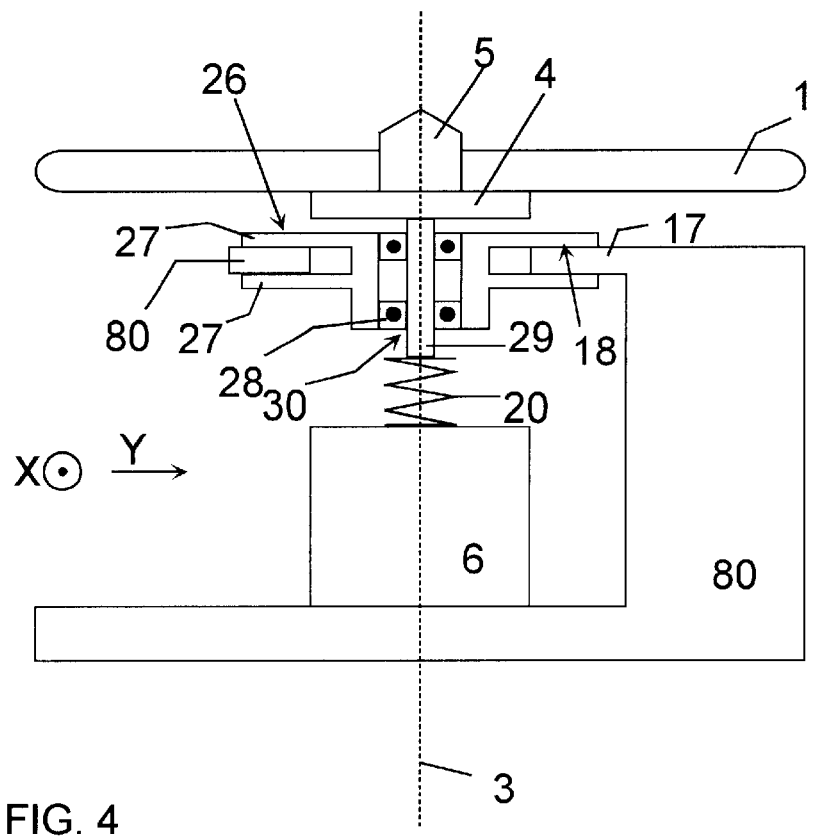

FIG. 4 shows a disk player 80 to which the driving means 6 are rigidly fixed. A Sliding support 26 comprises edges 27 which allow to slide the sliding support 26 on supporting surfaces 18 of the disk player platform 17. Second bearing means 28 allow the fixing means 4 and 5 to rotate relatively to the sliding support 26 by means of an elongated part 29 of said fixing means which passes through a drive opening 30 of the second bearing means 28. The sliding support 26 merely slides in X or Y direction. Compared to the disk player 79 shown in FIG. 3 the driving means 6 in FIG. 4 need less work to rotate the data carrier 1 because no energy losses occur through friction of the fixing means plate 4 on the disk player 80.

Optionally centering means as shown in FIG. 3 may also be used in the disk player shown in FIG. 4. The centering means position the fixing means to a central rest position at least when the driving means 6 rest.

Figure 5:
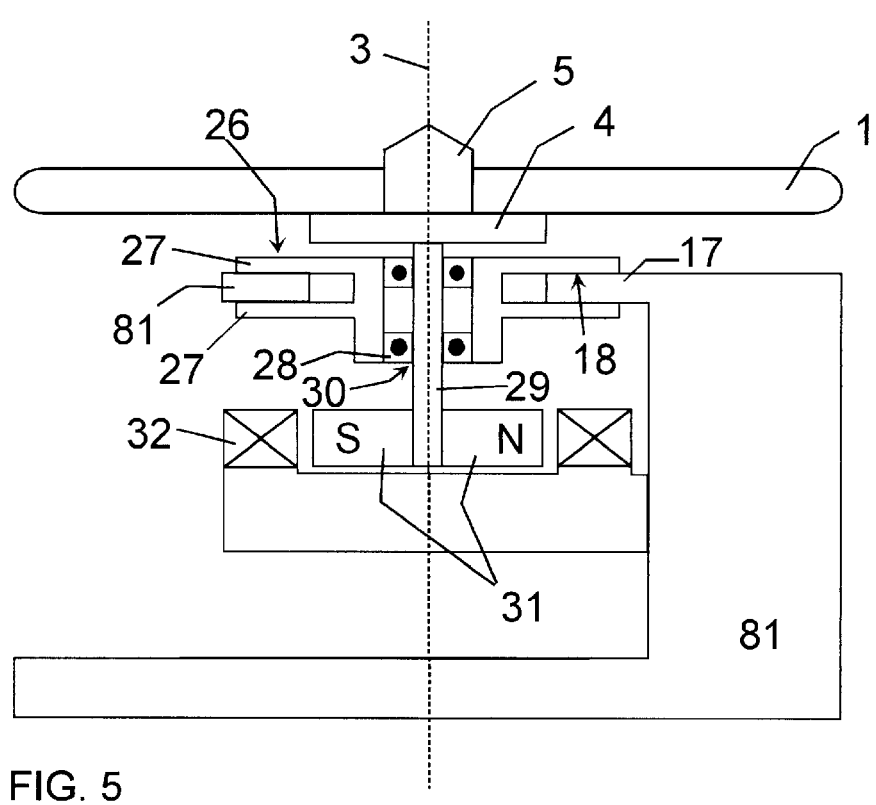

FIG. 5 shows a disk player 81 which similar to the disk player 80 in FIG. 4 comprises a disk player platform 17 having supporting surfaces 18. A sliding support 26 comprises edges 27 which allow to slide the sliding support 26 on the supporting surfaces 18. The fixing means comprise an elongated part 29 which is inserted in a drive opening 30 of said sliding support 26 together with second bearing means 28. This way the fixing means 4, 5 and 29 may rotate relatively to the sliding support 26. A rotor magnet 31 is fixed at an end of the elongated part 29, and rotates together with the fixing means. The rotor magnet 31 is part of driving means which further comprise a stator electro-magnet 32 rigidly mounted on the disk player 81. The stator electro-magnet 32 is an electro-magnet which together with the rotor magnet 31 cooperates as an electric motor used to drive the fixing means and the data carrier 1. When the driving means are at rest the rotor magnet 31 is positioned between components of the stator electro-magnet 32 such that it is separated from the latter by an air gap. The latter air gap allows the rotor magnet 31 to adopt a gyroscopic movement when the fixing means 4, 5, 29 and the data carrier are brought into high rotation speed. The sliding support 26 allows the rotation axis 3 to rotate around a rest position of the rotation axis 3 while the data carrier 1 is rotated around the rotation axis 3. This way no vibrations due to the eccentered mass center of the fixing means/data carrier assembly is transmitted to the disk player 81.

Optionally, centering means similar to the one shown in FIG. 3 may be used in the disk player shown in FIG. 5. The centering means position the fixing means to a central rest position at least when the driving means rest.

Optionally, limiting means (not shown) may be mounted on the platform 17 or nearby a side of the centering means in order to limit a sideways sliding of the sliding support 26 and such to avoid a contact of the rotor magnet 31 with the stator magnet 32.

Figure 6:
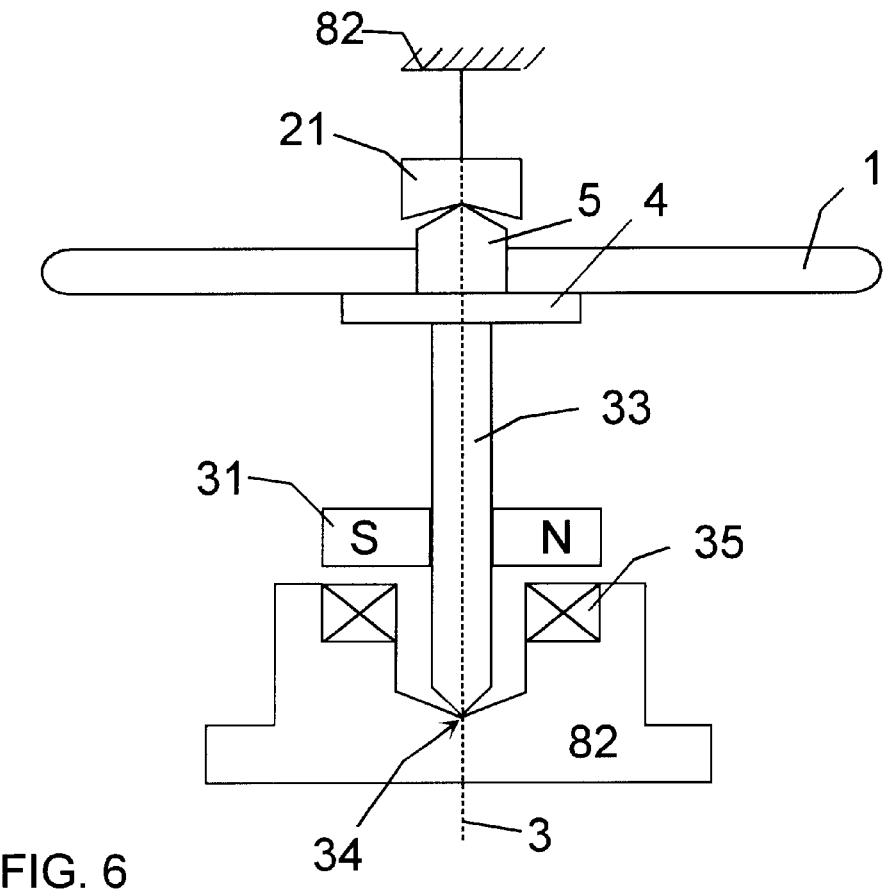

FIG. 6 shows a disk player 82 in which the fixing means comprise an elongated part 33 fixed to the plate 4 and the part 5. The elongated part 33 is at one end terminated by a tip which lies on a point bearing recess 34 integral to the player 82. Opposite to the tip end of the elongated part 33 the part 5 is terminated by another tip which cooperates with a further point bearing comprised in the centering means 21. Hence the assembly of the fixing means 4, 5, 33 and the data carrier 1 rotates between two point bearings. The centering means 21 are further used to position the fixing means in a central rest position when the assembly stops rotating, and guide the fixing means while the latter assembly goes in a gyroscopic movement during its rotation around the rotation axis 3. The fixing means and the data carrier 1 are driven by driving means which comprise a rotor magnet 31 mounted on the elongated part 33, and a stator electro-magnet 35 which is mounted on the disk player 82. The stator electro-magnet 35 is an electro-magnet and cooperates with the rotor-magnet 31 as an electrical motor used to rotate the fixing means and the data carrier 1. While the data carrier 1 rotates around the rotation axis 3 and the assembly adopts the gyroscopic movement around the rest position of rotation axis 3, the rotation axis 3 may also rotate around a point determined by the contact of the elongate part 33 and the point bearing 34. The latter rotation of the rotation axis 3 will cause a focus deviation in the reading means (not shown) which will have to be corrected by refocusing the light spot and the track being read.

Figure 7:
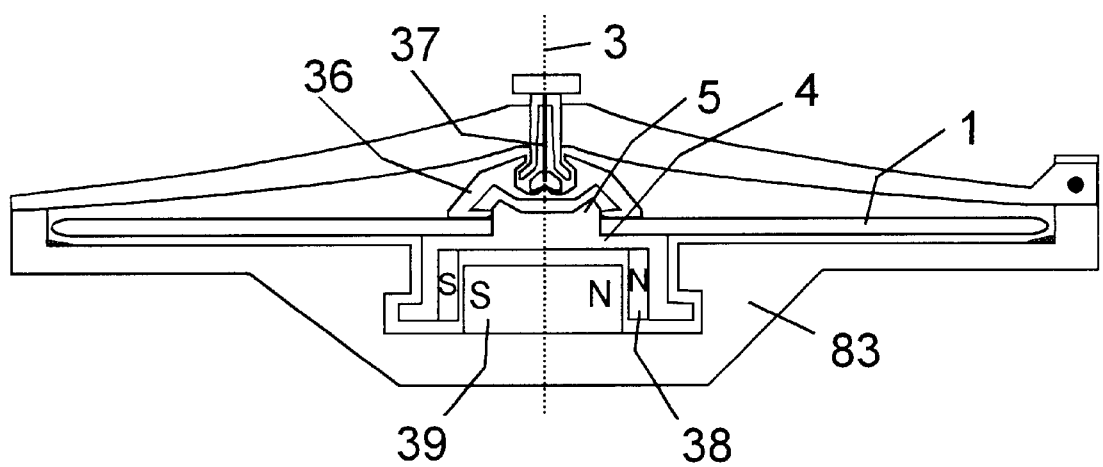

FIG. 7 shows a simplified disk player 83 in which a part 5 of the fixing means is centered by annular centering means 36. An elastical bar 37 allows to keep the annular centering means 36 in a central rest position when the fixing means and the data carrier 1 are at rest. A rotor magnet 38 mounted on edges of the plate 4 of the fixing means cooperates as part of an electrical motor with a stator electro magnet 39 fixed on the disk player 83. When the stator electro magnet 39 is provided with current the rotor magnet 38 and thus the fixing means 4, 5 and the data carrier 1 are forced towards the annular centering means 36 and start rotating. Air gaps between the rotor magnet 38 and the stator electro-magnet 39 allow the rotating assembly to adopt a gyroscopic movement around a rest position of the rotation axis 3.

In a preferred embodiment of the disk player 83 shown in FIG. 7 a point bearing mounted at the rest position of rotation axis 3 on the static electrode magnet 39 allows the plate 4 of the fixing means to remain at a determined distance from the static electro-magnet 39 even when no current is provided. The latter point bearing is not shown in FIG. 7.

Figure 8:
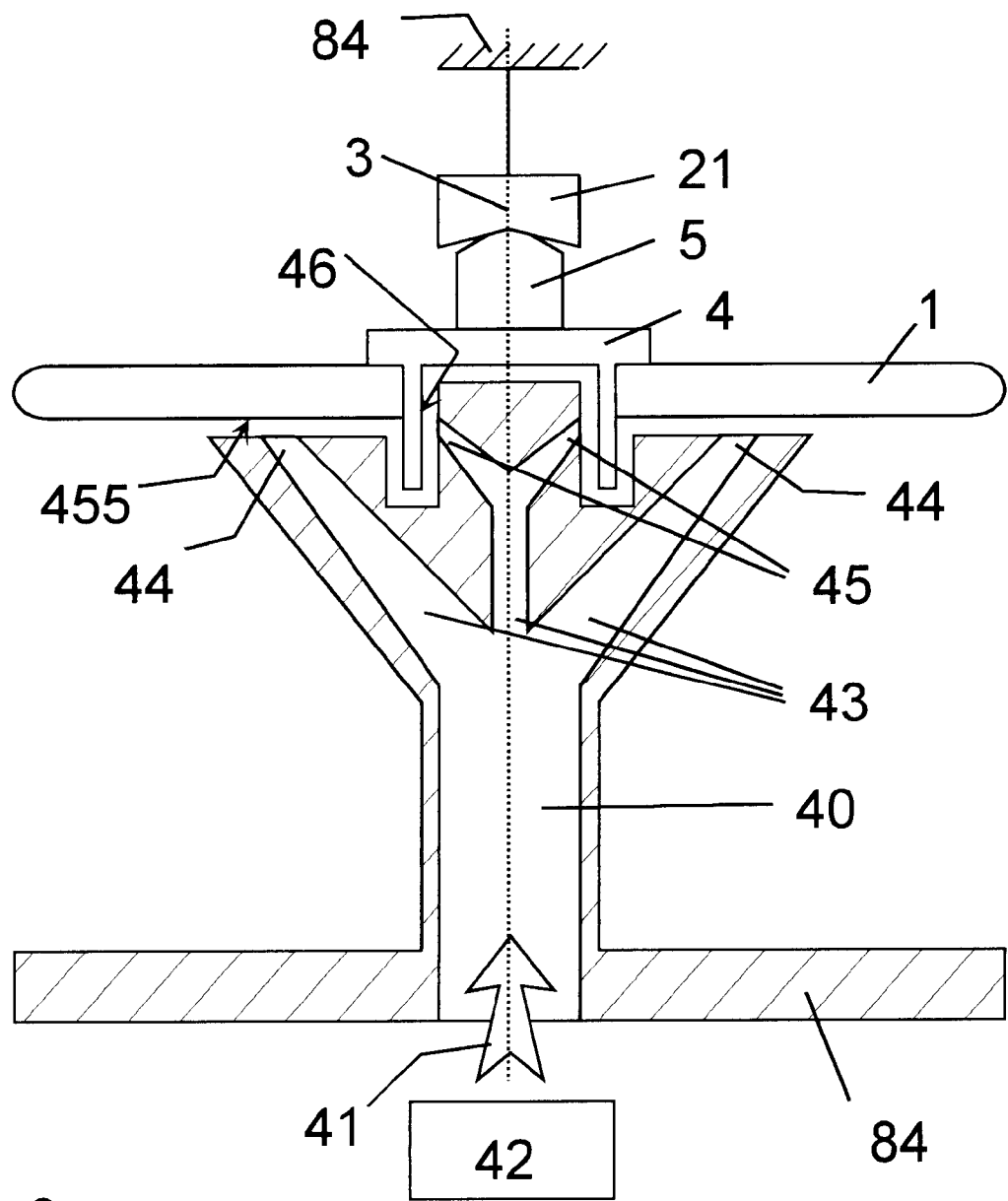
FIG. 8 shows a schematical representation of a device according to the invention which comprises pneumatical driving means, FIG. 9 contains an explanatory drawing to visualize an action of a stream of air in FIG. 8.

FIG. 8 shows a disk player 83 which comprises pneumatical driving means. The data carrier 1 has edges of the plate 4 of the fixing means inserted into its opening. The part 5 of the fixing means cooperates with centering means 21 which allow to center the fixing means in a central rest position at least when the data carrier stops rotating, and to guide the assembly of the fixing means and the data carrier in the gyroscopic movement while the data carrier 1 is rotated. Driving means comprise canalization means 40 which at one end receive a stream of air 41 generated by compressor means 42. The stream of air 41 is splitted up by smaller canalization means 43 which terminate in nozzles 44 and 45. The nozzles 44 direct the stream of air 41 onto a surface 455 of the data carrier 1 such to transmit to the data carrier 1 a force which sets the data carrier 1 into rotation and a lifting force which keeps the data carrier 1 at a determined height from the nozzles 44. The nozzles 45 direct the stream of air at an outer periphery of a tube formed by the canalization means and which is surrounded by a further tube realized by the edges of the plate 4. The stream of air blowing out of the nozzles 45 pushes on a surface 46 of the edges of the plate 4 and prevents that the fixing means come in contact with the outer periphery of the canalization means. The result is that during rotation of the data carrier 1 and the fixing means 4, 5 an air cushion between the canalization means and the rotating assembly minimizes friction and allows the rotating assembly to adopt a gyroscopic movement caused by an eccentered mass center of the rotated assembly. No vibrations are transmitted to the disk player 84.

Figure 9:
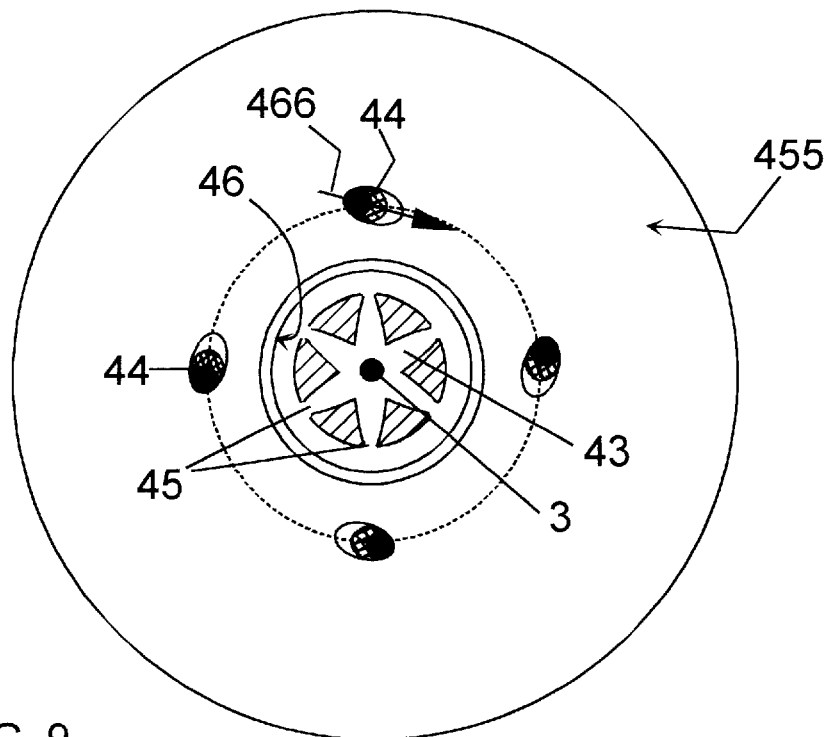

FIG. 9 shows a view of the device shown in FIG. 8 along a plane which through is perpendicular to the plane of the FIG. 8. The view is taken through the data carrier 1 looking from the plate 4 of the fixing means (not shown) toward the canalization means. Four nozzles 44 are symmetrically located around a rest position of the rotation axis 3 represented by a black spot. The parts of nozzles 44 which are darkly filled in the figure are the ones that are further away of the surface 455 whereas the parts of the nozzles 44 which are filled with a cross lines patterns and the ones left empty respectively are nearer to the surface 455. This way of illustrating the nozzles 44 shows that a stream of air coming from the darkly illustrated part to the empty illustrated part of nozzles 44 blows in a direction represented by the arrow 466 and accordingly creates a force on the surface 455 which rotates the data carrier 1.

The nozzles 45 which end canalization means 43 are distributed symmetrically at six points of the outer periphery of the canalization means and direct the air stream of the inner surface 46 of the fixing means edges.

Figure 10:
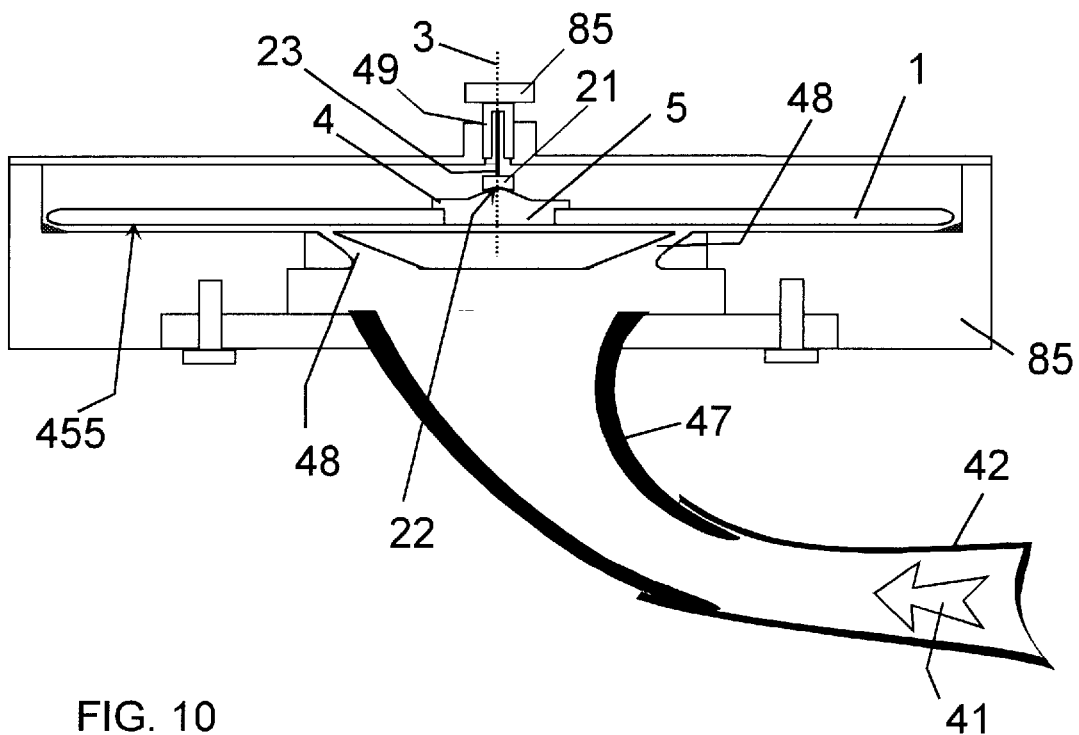
FIG. 10 shows a schematical representation of a pneumatically driven device according to the invention, FIG. 11 contains a schematical representation of a device according to the invention which comprises pneumatical driving means.

FIG. 10 shows a disk player 85 having another embodiment of pneumatical driving means. The part 5 of the fixing means is inserted in the opening of the data carrier 1 and once inserted a surface of the part 5 closes the opening of the data carrier 1 and lies in the same plane as the surface 455 of the data carrier 1. An output of the compressor means 42 blows an stream of air 41 into canalization means 47. The stream of air is splitted into a plurality of nozzles 48, the latter being symmetrically positioned around a determined rest position of the rotation axis 3. Centering means 21 comprising a conical recess 22 are fixed to an elastical bar 23 and position the fixing means in the determined rest position when the data carrier 1 is at rest. A sideways movement of the elastical bar 23 is limited by the wall of a tube 49 placed around the elastical bar 23 and fixed at one end to the disk player 85.

The nozzles 48 direct the stream of air on the surface 455 such to lift the data carrier 1 and the fixing means 4, 5 by creating an air cushion between the latter and the disk player 85, and such to create a driving force on the data carrier 1 in order to rotate the latter at relatively high speed. The assembly of the data carrier and the fixing means 4, 5 starts to go into a gyroscopic movement around the rest position of the rotation axis 3. No vibrations resulting from an eccentered mass center of the assembly are transmitted to the disk player 85.

Figure 11:
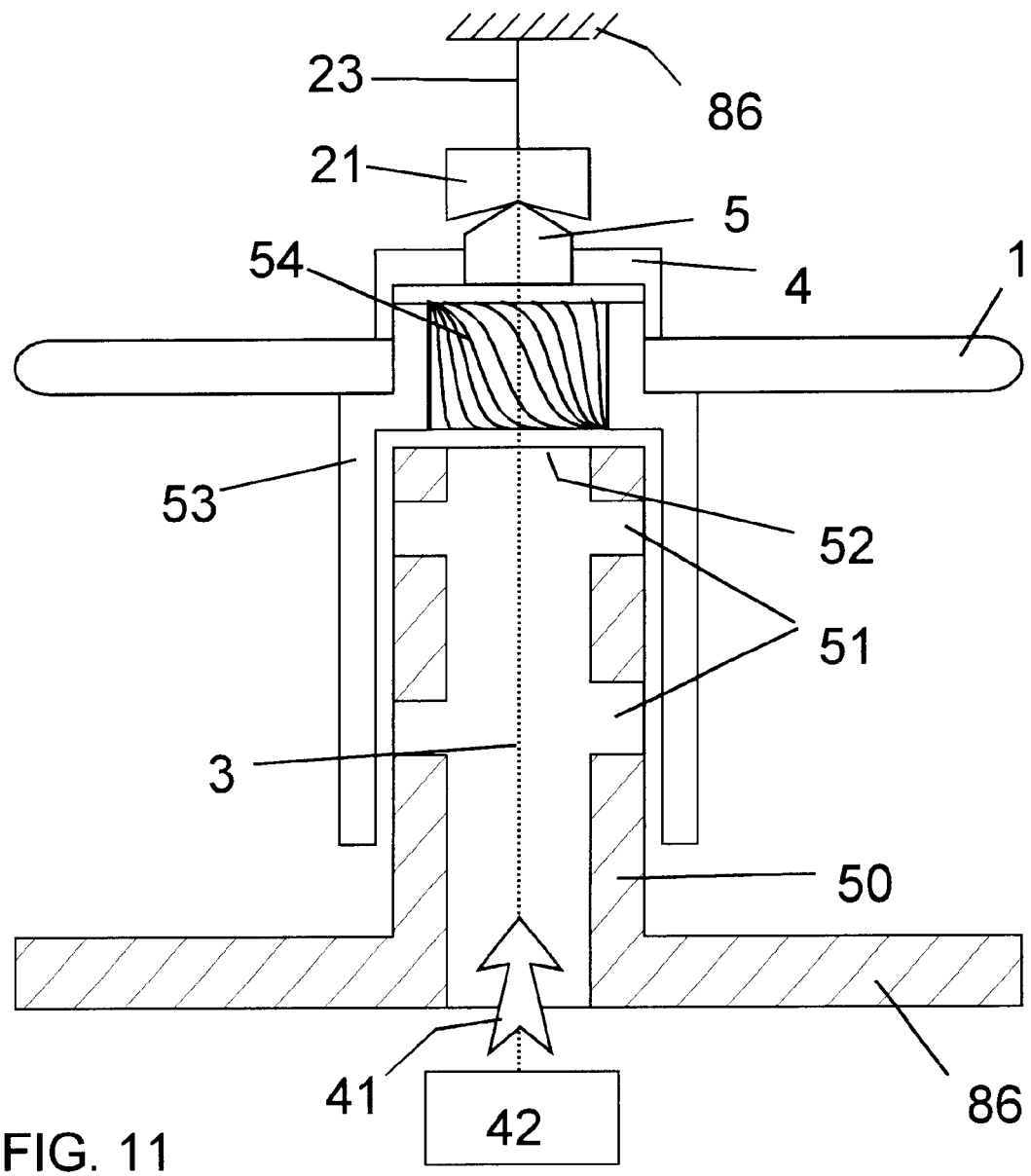

FIG. 11 shows a disk player 86 in which the driving means comprise a first tube 50 into which a stream of air 41 is blown by compressor means 42. The first tube 50 has openings at its periphery terminated by nozzle 51. The first tube 50 has at another end an opening 52 through which a part of the stream of air 41 blows. The fixing means comprise a second tube 53 which at one end is fixed to the plate 4 and at another end as an opening which allows to fit the second tube 53 over the first tube 50 thereby covering nozzles 51. An inner size of the second tube 53 is dimensioned such that an air gap remains between the tube 53 and the first tube 50 when the latter is inserted into the former. The end of the second tube 53 located near to the plate 4 is terminated by a turbine 54 which offers surfaces to the air stream 41 exiting the opening 52 of the first tube 50 such that the fixing means 53, 4, 5 and the data carrier 1 are set in rotation. At the same time the second tube 53 is lifted at a determined distance from the first tube 50 such that it may freely rotate around the first tube 50. The centering means 21, 23 guide the fixing means in the gyroscopic movement which is adopted during rotation of the data carrier 1.

What is claimed is:

1. A device for rotating inside of a disk player and/or recorder a disk shaped data carrier having an opening around a center of said disk shaped carrier, said device comprising:

fixing means for removably fixing said data carrier by inserting a part of said fixing means in said opening, said fixing means having a rest position associated therewith;

driving means for rotating said data carrier by acting on said fixing means, said driving means being at least partly mechanically connected to said disk player and/ or recorder; and side moving means for allowing said fixing means to rotate about said rest position on a rotation plane substantially perpendicular to an axis of rotation of said fixing means, the side moving means comprising a flexible transmission means through which said driving means acts on said fixing means, an end of said flexible transmission means being connected to said driving means and another end of said flexible transmission means being connected to said fixing means.

2. The device according to claim 1 wherein said moving means further comprises a sliding support and said disk player and/or recorder comprises a supporting surface disposed parallel to said rotation plane, such that said sliding support slides on said supporting surface, said sliding support having a drive opening through which said driving means acts on said fixing means.

3. The device according to claim 2 wherein said fixing means comprises an elongated part fitted through said drive opening together with a second bearing means which allow said elongated part to rotate inside said drive opening, said elongated part being connected to said another end of said flexible transmission means.

4. The device according to claim 3 further comprising centering means for positioning said fixing means in a central position when said driving means stops driving said data carrier.

5. The device according to claim 4, wherein said centering means comprises a conical recess which receives a tip shaped extremity from said fixing means, and is elastically mounted to said player and/or recorder.

6. A device for rotating inside of a disk player and/or recorder a disk shaped data carrier having an opening around a center of said disk shaped carrier, said device comprising:

fixing means for removably fixing said data carrier by inserting a part of said fixing means in said opening, said fixing means having a rest position associated therewith;

driving means for rotating said data carrier by acting on said fixing means;

side moving means for allowing said fixing means to rotate about an axis of said rest position on a rotation plane substantially perpendicular to an axis of rotation of said fixing means; and scanning means for scanning said data carrier, said scanning means being mechanically connected to said disk player and/or recorder such that said axis of rotation of said fixing means is able to move relative to said scanning means when said fixing means rotates about said axis of said rest position.

* * * * *